Jan. 2, 1934.  C. M. HATHAWAY  1,942,059

OSCILLOGRAPHIC APPARATUS

Filed Jan. 29, 1932

Inventor:
Claude M. Hathaway,
by Charles E. Tullar
His Attorney.

Patented Jan. 2, 1934

1,942,059

UNITED STATES PATENT OFFICE 1,942,059

OSCILLOGRAPHIC APPARATUS

Claude M. Hathaway, Schenectady, N. Y., assignor to General Electric Company, a corporation of New York Application January 29, 1932. Serial No. 589,647

8 Claims. (Cl. 234—5.5)

This invention relates to oscillographs and more particularly to an improved and novel mechanism for operating the shutter of such an oscillograph.

Figure 1:
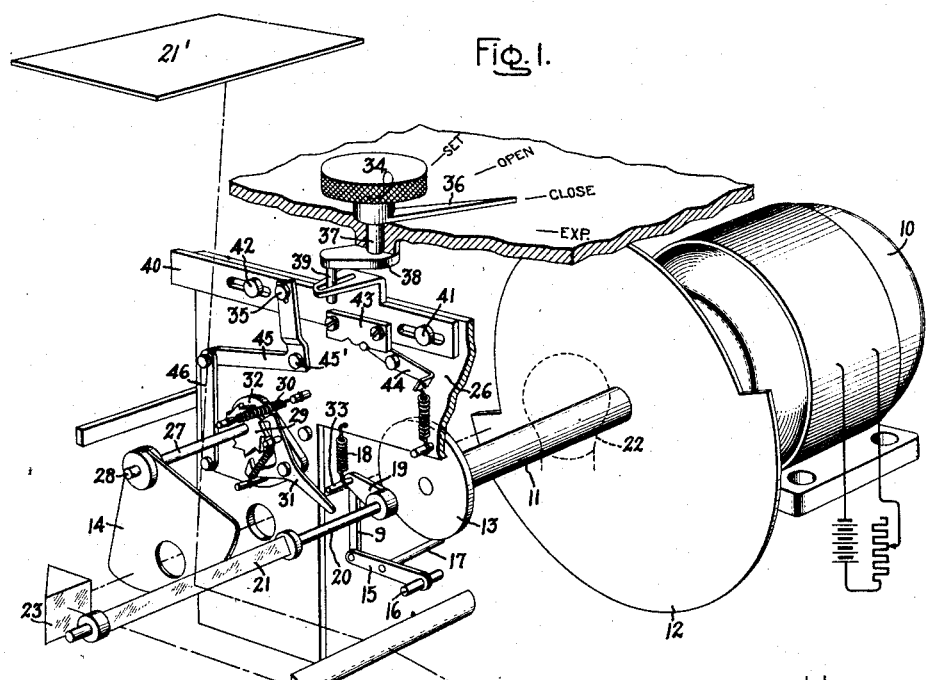
Figure 2:
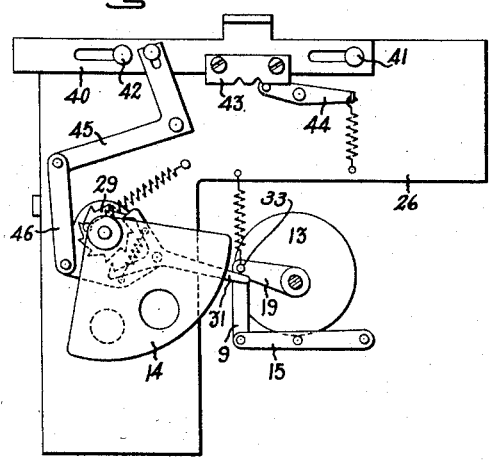

An oscillograph consists essentially of a galvanometer mirror which oscillates responsively to electric phenomena and reflects a light beam on a film or viewing screen in such a manner as to give an observable result. It is the usual practice to provide a shutter mechanism between the light source and the mirror in order that the viewing screen or film will be influenced only when it is desired to observe the phenomena or make records of them. My invention consists of a novel means of operating and controlling such a shutter. In Fig. 1 I have shown my invention in connection with a diagrammatic representation of the remaining parts of an oscillograph. In Fig. 2 I have shown my invention in a different operating position and in Fig. 3 I have shown a modification thereof.

In an oscillograph constructed in accordance with my invention an image of the phenomenon can be observed on the viewing screen by allowing the image to be retraced on the viewing screen with great rapidity. At the same time in case a record of such a phenomenon is to be made it is necessary that only one tracing of the phenomenon be made on a film. For viewing purposes I utilize the shutter 12 which intermittently allows the image of the phenomenon to be cast on the screen. For recording purposes I use the shutter 14 in conjunction with the shutter 12 whereby only one tracing of the phenomenon can be made on the viewing screen 21' which screen in such case is replaced or covered by a photosensitive film.

My method of accomplishing these results can be understood by referring to the drawing in which 10 is a motor provided with an extended shaft 11 on which is rigidly mounted disk 12, which disk has half of its circumference of a smaller diameter than the other half so that a lamp 22 mounted behind this disk can reflect its light to the optical system (to be described later) only during one-half revolution of the disk 12. On shaft 11 and beyond the disk 12 an eccentric wheel 13 is located, the eccentricity of which has a definite relationship to the change in diameter of the disk 12. This relationship will be fully explained in the operation of my device.

This eccentric wheel controls the shutter vane 14 and oscillates the mirror 21 cooperatively therewith by means of a system of links and lever arms. Lever arm 15 is pivotally mounted at one end to shaft 16 which shaft is held stationary in any suitable manner. Lever arm 15 has at its center point a rigidly fastened projecting arm 17 extending into engagement with wheel 13 and by means of which eccentric wheel 13 controls the movement of arm 17 and consequently the movements of mirror 21 and shutter vane 14. This is done by means of link 9 which correlates the movement of lever arm 15 with the movement of oscillatable arm 19 which moves against the force of the spring 18 and to which arm 19 is rigidly attached the shaft 20 on which the mirror 21 is mounted. This mirror is a part of an optical system which consists of the following apparatus named in the order of their operation from the source of light 22: prism 23, galvanometer mirror 24, cylindrical lens 25, mirror 21 from which the light ray passes to the screen indicated at 21'.

To correlate the movement of mirror 21 with the movement of the shutter vane 14, I have the shutter vane rigidly fastened to hollow shaft 27 which shaft is movably mounted on extension arm 28, said arm being rigidly fastened to backing plate 26 by riveting, by having the arm 28 threaded with a corresponding threaded opening in the backing plate 26, or by any other well known method. This hollow shaft 27 has mounted on its end opposite to the end on which the shutter vane is mounted, a ratchet gear 29 which tends to rotate in a clockwise direction by means of spring 30, one end of which spring is attached to a pin on the ratchet gear and the other end of which is attached to a pin on the backing plate 26. Cooperating with this ratchet gear 29 is the bifurcated pawl 31. This pawl is pivotally mounted on plate 32 which is in turn rotatably mounted on stationary extension shaft 28. The bifurcated pawl 31 is provided with a projecting arm which cooperates with projecting arm 33 of arm 19 to control the shutter 14 automatically.

To manually control the shutter and to reset it for automatic operation, I have plate 32 controlled through a system of links and lever arms by knob 34 which is provided with a pointer 36 which can be set for the operating positions indicated as: set, open, close, exp. This knob is provided with a shaft 37 to which is rigidly attached member 38. Member 38 is provided with a projecting pin 39 which cooperates with the slotted extension of plate 40 which is slidably mounted on backing plate 26 by means of pins 41 and 42. An auxiliary plate 43 provided with notches is fastened to sliding plate 40 which notches cooperate with arm 44 in order to correlate the positions of the sliding plate with the indications of the pointer 36. A lever arm 45 having angular extensions is pivoted to plate 40 by means of pin 35. This lever arm oscillates about pin 45', fastened to backing plate 26, as an axis. To the end of this lever arm opposite the end fastened to plate 40, one end of link 46 is attached, the other end of which is fastened to plate 32. It is obvious that by rotating knob 34 clockwise plate 32 is rotated counter-clockwise; and that by rotating this knob counter-clockwise plate 32 is rotated clockwise.

Figure 3:
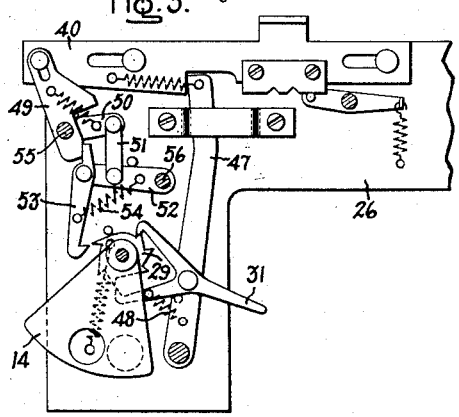

In the modification shown in Fig. 3 the system of levers and links is somewhat different, although the result accomplished is the same. The bifurcated pawl 31 is pivoted on lever arm 47, which arm is pivoted to backing plate 26 at one end. The pawl is held in engagement with ratchet 29 by means of spring 48. The opposite end of arm 47 cooperates with plate 40 so that by moving said plate the lever 47 is proportionately moved causing the bifurcated pawl to move into and out of engagement with ratchet wheel 29. The movable plate 40 has pivoted to it lever arm 49, which through a system of lever and links 50, 51, 52 and 53 controls ratchet wheel 29 and consequently shutter vane 14. It should be noted that pivots 55 and 56 are fastened to backing plate 26. By moving plate 40 to the right the lever arm 53 moves downward and its upper end is freed from the downwardly projecting end of arm 49, allowing the catch on lever arm 53 to be pulled into engagement with the teeth of ratchet wheel 29 by means of spring 54. By moving the plate 40 to the left the shutter is rotated clockwise until the position shown in Fig. 3 is assumed by the shutter.

The operation of the above described invention will be obvious to those skilled in the art; but for the purpose of rendering the description complete, I shall describe the operation as follows: The galvanometer mirror 24 is connected to the line 58 by means of potential transformer 57 and at all times oscillates responsive to the line phenomena. The motor 10 rotates at all times, and for the purpose of describing the operation, I will assume that it is rotating clockwise. As it rotates, it allows the light from lamp 22 to pass to the optical system during the half revolution of the disk 12 that the lamp is opposite the portion of the disk which is of lesser radius. During this time, the cam 13 through its eccentric position swings the mirror 21 in a clockwise direction, sweeping the beam of light from left to right across the screen. The eccentric portion of the cam 13 is so arranged that the spring 18 returns the mirror 21 to its original position during the time that no light reaches the optical system. At the position "set" of the pointer 36 the shutter vane 14 has its opening to the left of the counterpart of its opening in the backing plate 26. Moving the pointer to "open" rotates the shutter so that the hole in the shutter vane 14 and backing plate 26 are in line and the movements of the light ray can be observed on the screen 21'. If the pointer is moved to "close", the shutter turns to the position shown in Fig. 1 and the light from the lamp 22 is prevented from reaching the optical system. Moving the pointer to "exp.", meaning "expose", places the projecting arm of bifurcated pawl in the position shown in Fig. 2 in which position it can be struck by projecting pin 33. This is the automatic position, and as the motor rotates in addition to oscillating mirror 21 by means of cam 13 by means of this cam the lever arm 19 is pulled downward, striking pawl 31 and allowing the ratchet wheel 29 to slip a tooth, thus lining up the holes on the shutter vane and in the backing plate. This takes place just prior to unscreening of the lamp. The mirror at the same time begins to sweep the image across the screen. The mirror returns to its original position during the time the lamp is screened by disk 12 and before the lamp is unscreened again the cam wheel will have made another complete revolution and strikes the pawl again, which allows the ratchet wheel to slip another tooth and close the shutter. This automatic arrangement allows only one sweep of the mirror across the screen after which time the pointer must be returned to "set" before the shutter can again be controlled.

While I have described particular embodiments of my invention, it will be obvious to those skilled in the art that various modifications may be made without departing from the spirit of my invention and I, therefore, desire to cover all such modifications as fall within the scope of my invention in the appended claims.

What I claim as new and desire to secure by Letters Patent of the United States, is:

1. In an oscillograph provided with means for producing light and a galvanometer mirror adapted to intercept light from said source, means arranged between said light source and said mirror for allowing light to reach said mirror during only predetermined intervals of time, a shutter located in said light path, and means controlled by said light controlling means for operating said shutter so as to allow light to pass only during a selected one of the intervals when said light controlling means allows light to reach said mirror.

2. An oscillograph comprising a film, a motor, a light source, a galvanometer mirror moving responsively to a condition to be recorded and adapted to receive the light from said light source, means operated by said motor to allow said galvanometer mirror to receive light intermittently from said light source, a sweep mirror adapted to receive the reflections of light from said galvanometer mirror and operated by said motor so as to sweep the light from said sweep mirror across the film, and shutter means driven by said motor to allow said sweep mirror to be illuminated during only one of its sweeps.

3. An oscillograph for recording an electric phenomenon, comprising a film, a light source, means for intermittently obstructing the light from said light source, a galvanometer mirror adapted to periodically receive the light from said source and to oscillate responsively to said phenomenon, a sweep mirror adapted to sweep the reflection of light from said galvanometer mirror across said film, when said light source is not obstructed and a shutter means controlled by said light controlling means to allow only a selected sweep of light from said sweep mirror to be made across said film.

4. In an oscillograph including a light source, a galvanometer mirror placed in the range of said light and vibrating responsively to a condition to be recorded, a film, and a motor, means driven by said motor to allow light to reach said galvanometer mirror only at definite intervals, a sweep mirror operated by said motor, said mirror sweeping its light across said film, and shutter means driven by said motor to allow light to reach said galvanometer mirror during only one selected sweep of said sweep mirror.

5. An oscillograph comprising a light source, a motor for controlling the light from said light source, a galvanometer mirror receiving the light from said light source and oscillating responsively to a condition to be observed, a sweep mirror receiving the rays of light from said galvanometer mirror, said sweep mirror being adapted to be oscillated by said motor and means operated by said motor to allow only one selected movement of said sweep mirror in one direction to be observed.

6. In an oscillograph, means for producing a ray of light, a movable shutter arranged to pass said ray of light for a predetermined interval of time and to block said ray for a predetermined interval of time, a second shutter normally blocking said ray and means moved when the first shutter moves, for controlling the operation of said second shutter to pass said light ray for a selected one of said light passing intervals.

7. In an oscillograph of the type having means for periodically obstructing the light beam, and a sweep mirror for sweeping the light beam across a light-receiving device, the combination of shutter means controlled by said light-obstructing device, and manual means for adjusting said shutter.

8. In an oscillograph of the type having means for periodically obstructing the light beam, and a sweep mirror for sweeping the light beam across a light-receiving device, the combination of shutter means controlled by said light-obstructing device, and operable to a plurality of positions and manual means for controlling the position of said shutter.

CLAUDE M. HATHAWAY.